United States Patent [19]

Jones

[11] Patent Number: 5,267,585
[45] Date of Patent: Dec. 7, 1993

[54] ELASTOMERIC FLOW CONTROL VALVE

[75] Inventor: Thomas C. Jones, Columbia, Md.

[73] Assignee: BOC Health Care, Inc., New Providence, N.J.

[21] Appl. No.: 907,478

[22] Filed: Jul. 1, 1992

[51] Int. Cl.⁵ .................. F16K 11/056; F16K 1/02; B08B 9/06

[52] U.S. Cl. .................. 137/240; 134/166 C; 137/597; 137/605; 137/625.4; 137/625.42; 137/872; 137/901; 138/46; 251/205; 251/275

[58] Field of Search .......... 137/901, 240, 597, 605, 137/872, 877; 138/45, 46; 251/205, 275, 900; 134/166 C, 167 C, 168 C, 169 C

[56] References Cited

U.S. PATENT DOCUMENTS

| | | | |
|---|---|---|---|
| 112,000 | 2/1871 | Wise et al. | 137/901 |
| 123,031 | 1/1872 | Maclaren | 137/901 |
| 143,294 | 9/1873 | Mendham | 137/901 |
| 230,173 | 7/1880 | Brandeis | 137/901 |
| 498,894 | 9/1865 | Krull | 251/275 |
| 1,004,845 | 10/1911 | Bohme | 251/205 |
| 1,249,090 | 12/1917 | Hoff | 251/275 |
| 1,296,257 | 3/1919 | Beach | 251/275 |
| 1,366,803 | 1/1921 | Hofmann | 251/275 |
| 3,294,360 | 12/1966 | Lundberg | 251/205 |
| 4,685,654 | 8/1987 | Hu | 251/205 |

FOREIGN PATENT DOCUMENTS

| | | | |
|---|---|---|---|
| 668674 | 12/1938 | Fed. Rep. of Germany | 137/317 |
| 2405237 | 8/1975 | Fed. Rep. of Germany | 251/205 |

*Primary Examiner*—George L. Walton
*Attorney, Agent, or Firm*—Roger M. Rathbun; Larry R. Cassett

[57] ABSTRACT

A flow control valve is disclosed wherein a deformable elastomeric element is positioned at least partially within the flow path of a fluid passing between an inlet and an outlet. By deforming the elastomeric element, the cross-section of the flow path of the fluid is changed, thereby controlling the flow of fluid through the flow control valve. The elastomeric element may be of various standard configurations and is easy and inexpensive to replace in the event of excessive wear.

10 Claims, 6 Drawing Sheets

ELASTOMERIC FLOW CONTROL VALVE

BACKGROUND OF THE INVENTION

This invention relates to a flow control valve that achieves control of the flow of fluids through such valve by deformation of an elastomeric element positioned in the path of the fluid flow.

There are literally hundreds of types of flow control valves that have been manufactured, tried or currently being manufactured or sold. Although there are obviously differences in that various degrees of precision required in differing applications, the differing valves have a wide variety of costs as well as differing serviceability.

One of the goals is, of course, to achieve a flow control valve having sufficient precision and accuracy for the particular application while, at the same time, being relatively easy and inexpensive to manufacture and easy to service.

Current flow control valves such as needle valves are generally quite accurate, however, considerable precision is required in their manufacture and thus are fairly costly to produce. Leak free shut off is often very difficult to achieve as current valves wear from use. In addition, servicing needle valves requires replacement of seals and/or fairly expensive parts when the valve has become worn.

One type of valve used for liquid infusion and thus useful for extremely low flow liquids with very low differential pressures is shown in U.S. Pat. No. 4,685,654. That valve structure utilizes a flexible disc that has a ridge that is forced transversely into a v-shaped flow path. The valve features are quite difficult to manufacture and a specially shaped disc and flow path are required.

SUMMARY OF THE PRESENT INVENTION

In accordance with the present invention, a flow control valve is provided having the required accuracy and yet which is relatively easy to manufacture and service.

The flow control valve of the present invention comprises a housing containing a regulating chamber and a through channel within that regulating chamber that communicates between an inlet and an outlet such that a path for fluid is provided via the through channel from the inlet to the outlet.

An elastomeric element is interposed at least partially into the through channel such that the fluid passes along the surface of the elastomeric element in moving between the inlet to the outlet. Since the through channel has a cross-section larger than the portion of the resilient member in its normal free, undeformed state within the through channel, the fluid can freely flow through the flow control valve.

Control of that flow is achieved by deformation of the elastomeric element. That deformation is preferably accomplished by forcing the elastomeric element to expand into a regulating chamber by a force or to contract from the regulating chamber by relief of that force such that the elastomeric element returns (via its memory) to its original free shape.

As the elastomeric element is deformed, however, to reduce the flow of fluid through the channel, the deformation increases the cross-sectional area of the elastomeric element within the regulating chamber thus reducing the cross-section of the through channel, thereby reducing the area through which the fluid can flow. Eventually, with further deformation, the elastomeric element conforms to the internal sides of the regulating chamber and eventually fills the through channel completely, thereby shutting off both the inlet and the outlet. Thus, a positive shut off is achieved.

Accordingly, good flow control is realized since the flow of fluid passes across the surface of the elastomeric element and, as the elastomeric element is deformed to reduce flow, the through channel that exists between the outer surface of the elastomeric element and the internal surfaces of the regulating chamber is reduced in a smooth, even manner, thus flow through that through channel can be accurately controlled.

Upon release of the means used to deform the elastomeric element, the elastomeric element returns to its original free shape and geometry through its inherent memory, and flow through the flow control valve is increased in a precise and predetermined manner.

Since very few parts are involved in the flow control valve and precision machining is not required, the valve is relatively easy and inexpensive to manufacture. Similarly, the elastomeric element is virtually the only part subject to wear and when it becomes worn out, it is an easy task to remove the worn member and replace it with a new elastomeric element.

Accordingly, the flow control valve of the present invention achieves good flow control of fluids, is relatively inexpensive to manufacture and repair and achieves complete shutoff even after considerable use and wear.

These and other improvements and features of the present invention will become better understood from the detailed description of the preferred embodiments, set forth below taken in conjunction with the accompanying drawings.

BRIEF DESCRIPTION OF THE DRAWINGS

FIGS. 2A', 2B' and 2C' are schematic views of the flow control valve, taken, respectively, at the stages of flow control corresponding to FIGS. 2A, 2B and 2C;

DETAILED DESCRIPTION OF THE PREFERRED EMBODIMENT

Figure 1:
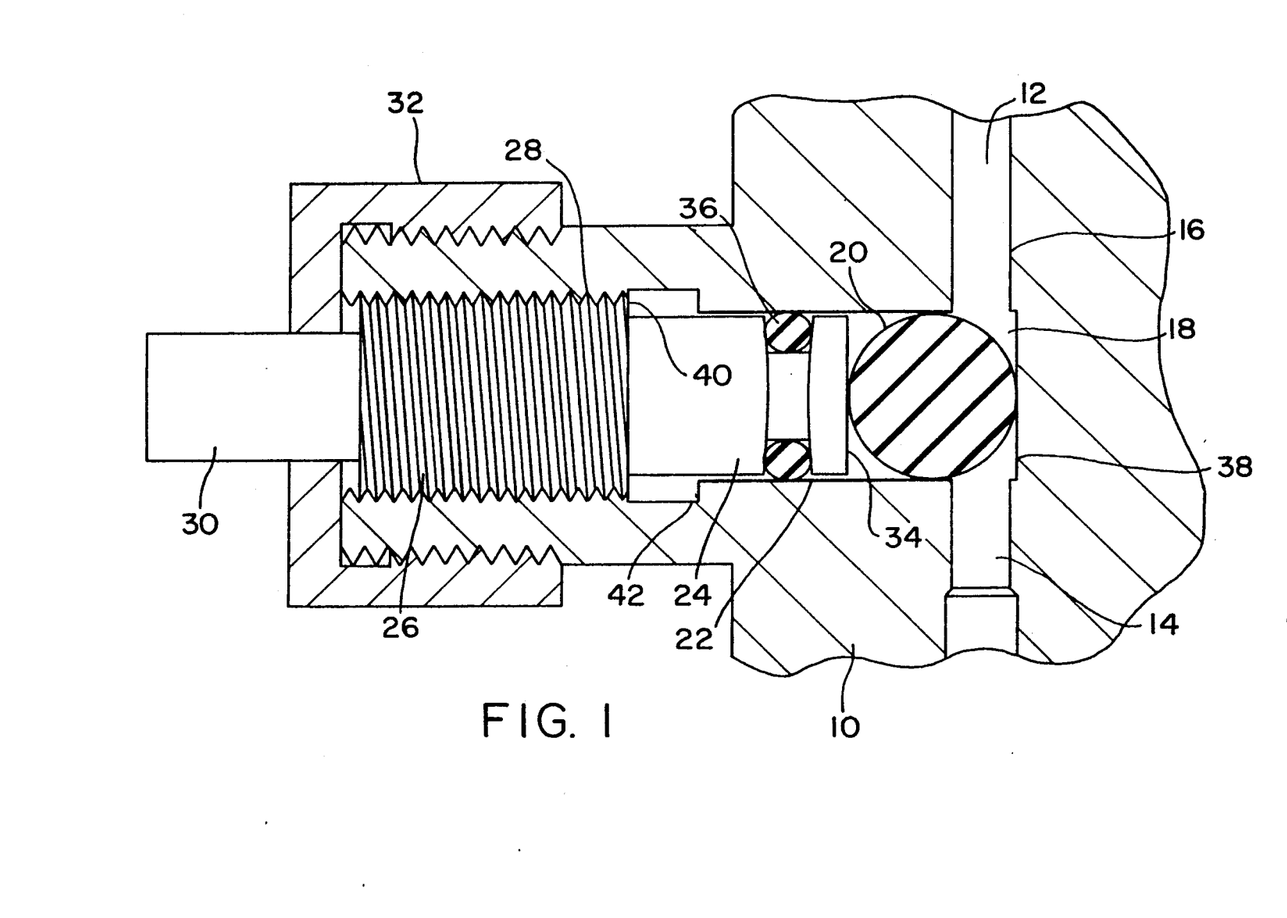
FIG. 1 is a cross-sectional view, partially cutaway, of a flow control valve constructed in accordance with the present invention.

Turning first to FIG. 1, there is shown a cross-sectional view of a flow control valve constructed in accordance with the present invention and which includes a valve body 10 having an inlet 12 and an outlet 14 with a bore 16 between the inlet 12 and the outlet 14 creating a flow path for fluid passing from the inlet 12 to the outlet 14. Within that bore 16 there is also formed, a regulating chamber 18 intermediate the inlet 12 and outlet 14. Both inlet 12 and outlet 14 are shown cut away however, as is conventional, each may have some means of becoming connected to a fluid conduit, not shown, by means of threaded fittings or the like.

At least partially located within the regulating chamber 18 is an elastomeric element 20 and which is formed of a material having a memory and which has a free state. The material may be an A type fluorocarbon rubber, one of which is available from the DuPont Company under the trademark name Viton. Alternate materials include urethane or other suitable elastomer that is easily deformed by application of a force to change its shape. As noted in the FIG. 1 embodiment, the free shape of elastomeric element 20 is spherical.

Extending at approximately 90° from the main axis of bore 16 is a further bore 22 formed in valve body 10 and within which is positioned valve spindle 24 which is threadedly engaged to valve body 10 by means of external threads 26 engaged to internal threads 28 in valve body 10. A stub 30 extends outwardly on valve spindle 24 for operation of the flow control valve as will become apparent. The stub 30 may, of course, be fitted with a knob (not shown) or other means by which it may be grasped and rotated. In addition, the type and number of threads formed in the engagement between valve spindle 24 and valve body 10 can be designed to achieve the desired lateral movement of valve spindle 24 with respect to the rotation thereof.

A cap nut 32 retains the valve spindle 24 in its position within valve body 10 and is threadedly engaged to the extension of valve body 10. At the other end of valve spindle 24, opposite stub 30, there is formed a flat surface 34 that engages elastomeric element 20 and a sealing means such as O-ring 36 is provided to seal valve spindle 12 within bore 22.

As may now be seen, the flow control valve is operable by deforming elastomeric element 20. In the position of FIG. 1, the elastomeric element 20 is in its free state, that is, without physical deformation and it is located at least partially within regulating chamber 18. Flow introduced into inlet 12 thus can pass around the elastomeric element 20 through the regulating chamber 18 and on to outlet 14.

In the position of FIG. 1, or open position, the flow of fluid is limited by the size of inlet 12, outlet 14 and the area between the elastomeric element 20 and the interior of regulating chamber 18. Thus, the configuration of regulating chamber 18 can also be shaped to accommodate the desired flow and, as a preferable shape, the regulating chamber 18 is cylindrical with a flat bottom 38.

In order to reduce the flow through to flow control valve, valve spindle 24 is advanced, by rotation, causing the flat surface 34 to deform elastomeric element 20 such that the cross-section of elastomeric element 20 within regulating chamber is enlarged, thus the flow path for the fluid moving between inlet 12 and outlet 14 is reduced. The valve spindle 24 can thus be moved to cause the deformation, however, a limit is established for maximum deformation. In the FIG. 1 embodiment, that limit of deformation is effected by limiting movement of the forward surface 40 of external threads 26 when that forward surface 40 reaches and abuts against a cylindrical ridge 42 formed within valve body 10.

In dimensioning the spherically shaped elastomeric element 20 with respect to bore 22, the elastomeric element 20 may be forceably fit within the bore 22 or, as an alternative the diameter of the bore 22 may be slightly larger than the outside diameter of the spherical elastomeric element 20; in which case, the spherical elastomeric element 20 is free to move somewhat and can rotate during its operation. Thus, the spherical elastomeric element 20 assumes a random orientation during use of the flow control valve and new areas are exposed to the various openings to be sealed and the overall wear is spread over the entire outer surface of elastomeric element 20, thus increasing its life.

Figure 2A:
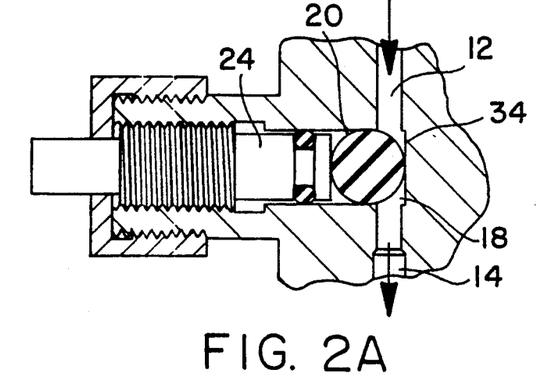
FIGS. 2A, 2B, and 2C, are further cross-sectional views of a flow control valve as shown in FIG. 1 but depicting various stages of flow control of the valve.
Figure 2B:
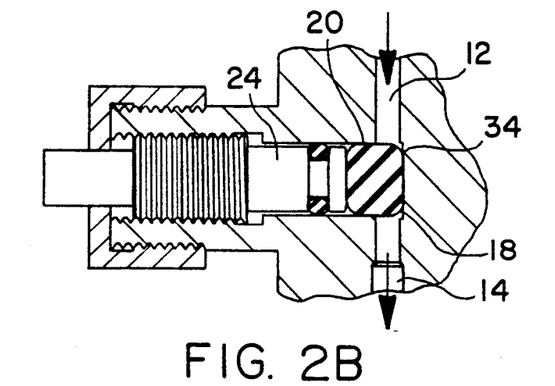
Figure 2C:
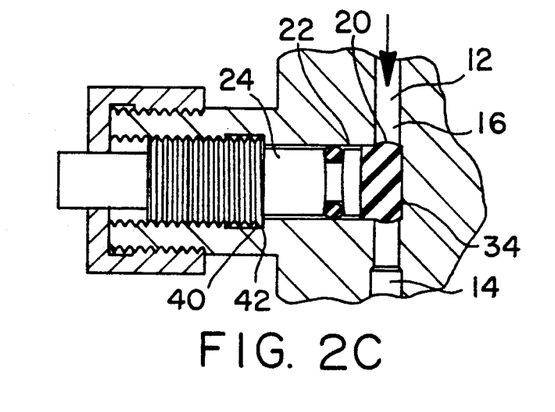

Turning now to FIGS. 2A-2C and 2A'-2C'; there is shown a cross-sectional view and schematic views, respectively of the valve spindle 24 in different positions and causing successive amounts of deformation of elastomeric element 20.

In FIGS. 2A and 2A', the flow control valve is in its open position and thus, as stated, the fluid is free to flow from inlet 12 to outlet 14 through regulating chamber 18. In the schematic of FIG. 2A, only a small portion of the elastomeric element 20 touches the flat surface 34 or regulating chamber 18 and thus only a minimum cross-sectional area of the elastomeric element 20 is in the path of that flow fluid.

In FIGS. 2B and 2B', the valve spindle 24 has been advanced by rotation and the elastomeric element 20 is deformed such that it occupies a larger volume, or cross-sectional area, within regulating chamber 18 and thus the flow path for fluid flowing between inlet 12 and outlet 14 is reduced. Accordingly, therefore, the flow of that fluid is reduced or controlled through the flow control valve. Again, in the schematic of FIG. 2B, the amount of elastomeric element 20 touching flat surface 34 is increased, thus a larger area of elastomeric element 20 is in the flow path of the fluid and the flow of fluid therefore is correspondingly reduced. Thus, as may be seen, by changing the amount of deformation of the elastomeric element 20 with respect to its volume occupying the regulating chamber 18, the flow of fluid through the flow control valve can readily be controlled.

Due to the memory of elastomeric element 20, when the valve spindle 24 is moved away from elastomeric element 20, thus reducing deformation, the elastomeric element 20 will return to its free or undeformed state and flow will increase, ultimately to return to the fully open position of FIGS. 2A and 2A'.

Finally, in FIGS. 2C and 2C' when the valve spindle 24 is moved to its fully inward position, such that the forward surface 40 abuts cylindrical ridge 42, the elastomeric element 20 is fully deformed and enters, to some degree into bore 16 external of regulating chamber 18, thus completely sealing the regulating chamber 18 and shutting off flow between inlet 12 and outlet 14. As can be seen in the schematic of FIG. 2C' the entire flat surface 34 of regulating chamber 18 is covered by the elastomeric element 20 and the elastomeric element 20 also extends outwardly to completely seal the bore 16. At this point, the sealing against high pressure is effective since the compressive forces on the elastomeric element 20 are distributed uniformly around the periphery of the regulating chamber 18. In addition, the stop provided by cylindrical ridge 42 prevents deformation of the elastomeric element 20 beyond its elastic limit and prevents extruding of the elastomeric element 20 outwardly from regulating chamber 18 toward inlet 12 and outlet 14.

Figure 3A:
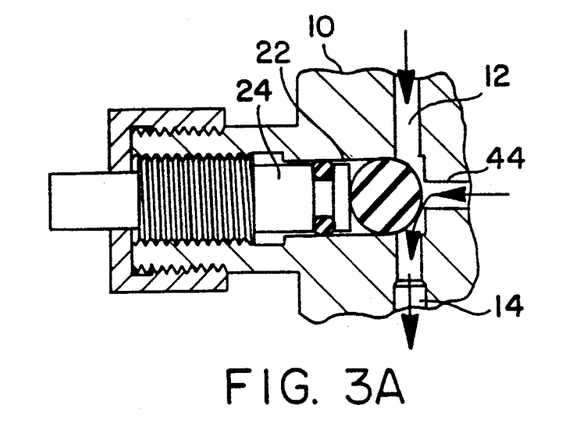
FIGS. 3A, 3B and 3C are cross-sectional views of an alternate embodiment of the flow control valve of the present invention.
Figure 3B:
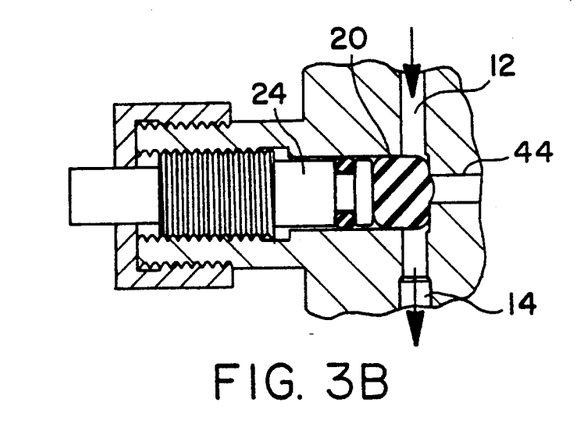
Figure 3C:
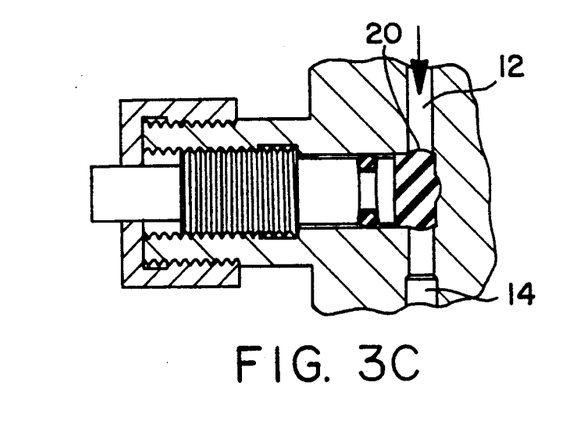

Turning now to FIGS. 3A-3C, there is shown cross-section views, partly cut away, of a further embodiment of the flow control valve and wherein a plurality of inlets is utilized. In FIG. 3A, a bypass inlet 44 is formed in valve body 10 and which may be used to provide a bypass flow. As shown, therefore in FIG. 3A, the inlet 12 is similar to be previous embodiment, but bypass inlet 44 is now formed generally coaxial with the valve spindle 24.

As can thus be seen in FIG. 3A, fluid is free to flow from inlet 12 and bypass inlet 44 through regulating chamber 18 to outlet 14 since elastomeric element 20 is positioned such as not to close off any inlet or outlet in regulating chamber 18 and is withdrawn to the extent necessary within bore 22. The elastomeric element 20 is held displaced from inlets by the various flows entering regulating chamber 18, principally from bypass inlet 44. Thus, additional flow is possible through the flow control valve of this embodiment than with the FIG. 1 embodiment and a flush function may be accomplished.

In FIG. 3B, the valve spindle 24 has been advanced, by rotation such that the elastomeric element 20 is deformed and has entered bypass inlet 44 to close bypass inlet 44 completely. Normal regulated flow is, however, still effective for flow of fluid between inlet 12 and outlet 14 as previously described with respect to the FIG. 1 embodiment.

Finally, in FIG. 3C, again, the elastomeric element 20 has been deformed such as to seal off the flow from inlet 12 and to outlet 14 and thus all flow through the flow control valve is blocked. Thus, the flow control valve is readily useable with multiple inlets and/or outlets to effect a desired flow characteristic.

Figure 4A:
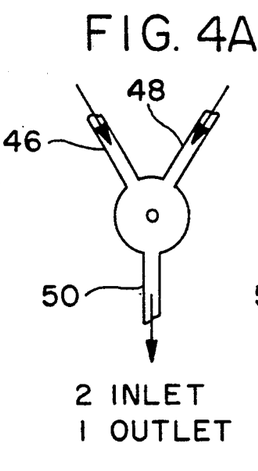
FIGS. 4A, 4B and 4C are schematic views depicting various configurations of inlets and outlets that may be used with the flow control valve of the subject invention.
Figure 4B:
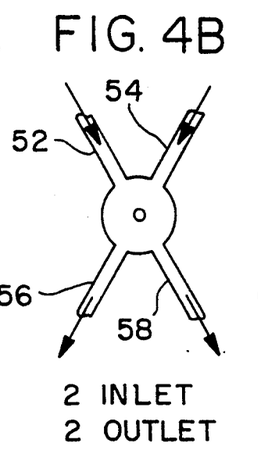
Figure 4C:
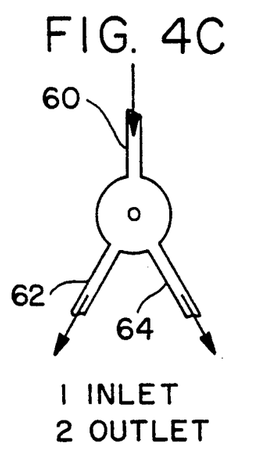

FIG. 4A-4C shows schematic views of alternate arrangement but having a plurality of inlets and/or outlets and in each instance, custom flow may be obtained by placing the elastomeric element within a regulating chamber and deformed as desired. In particular, FIG. 4A includes a plurality of inlets 46, 48 with a single outlet 50; FIG. 6B shows a plurality of inlets 52, 54 and a plurality of outlets 56, 58 while FIG. 6C depicts a single inlet 60 and a plurality of outlets 62, 64.

Figure 5A:
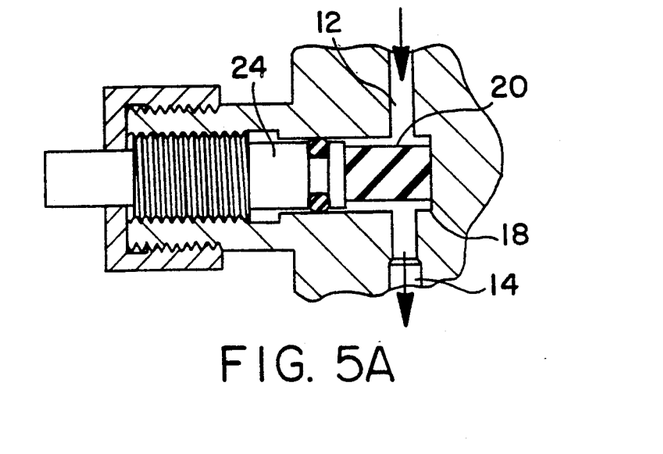
FIGS. 5A and 5B are cross-sectional views of a further embodiment of the flow control valve of the present invention showing an elastomeric element having a different configuration.
Figure 5B:
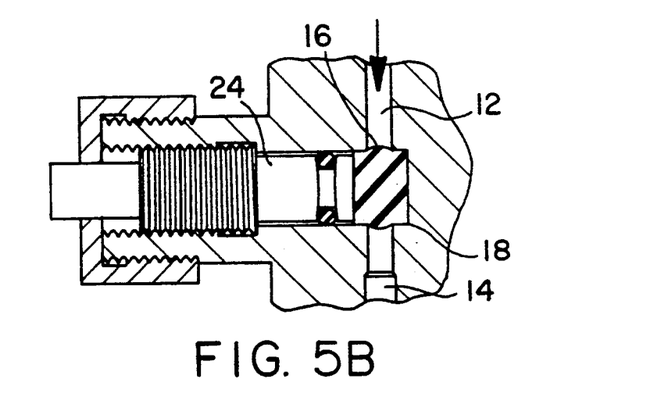

Turning now to FIGS. 5A and 5B, there is shown a cross-sectional view, partly broken away, of a further embodiment of the flow control valve of the present invention and where the free state of the elastomeric element 20 is cylindrical, rather than spherical. In this embodiment, the regulating chamber 18 may be cylindrical in shape and having its main axis generally coaxial with the valve spindle 24; as well as coaxial with the main axis of the cylindrical elastomeric element 20.

In FIG. 5A, the elastomeric element 20 is in its free, non-deformed state and flow can pass from inlet 12 to outlet 14 around the outer surface of elastomeric element 20.

In FIG. 5B, the valve spindle 24 has been advanced by rotation to deform elastomeric element 20 such that it deforms outwardly to fully close the bore 16 and thus close both the inlet 12 and outlet 14 from regulating chamber 18. Obviously, as explained with respect to the previous embodiment, the regulation of the flow of fluid passing from inlet 12 to outlet 14 is effected by deformation of elastomeric element 20 in varying degrees between the FIG. 5A and 5B positions.

Figure 6A:
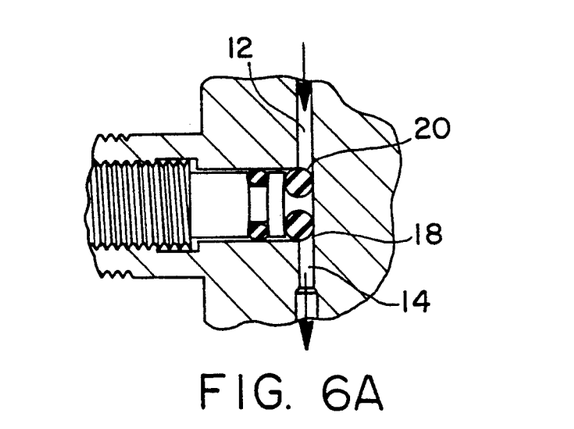
FIGS. 6A and 6B are still further cross-sectional views of an alternative elastomeric member used in the flow control valve of the present invention.
Figure 6B:
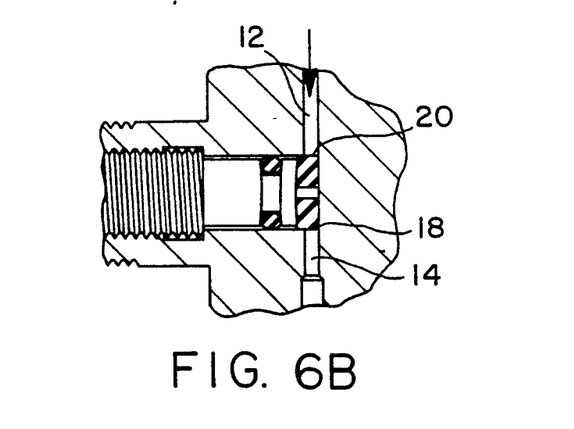

Finally, in FIGS. 6A and 6B, the elastomeric element 20 is in a still further free state, in this case a torroid. Again, in the position of the valve spindle 24 in FIG. 6A, flow may proceed around the elastomeric element 20 since regulating chamber 18 is cylindrical and coaxial with the torroidal shaped elastomeric element 20 but is slightly larger in inner diameter than the outer diameter of the torroidal shaped elastomeric element 20 in its free, non-deformed state.

In FIG. 6B, the valve spindle 24 has been advanced, by rotation, and deformed elastomeric element 20 so as to shut off and completely seal the bore 16 to seal off both inlet 12 and outlet 14 from regulating chamber 18.

Having set forth the invention in what is considered to be the best embodiment thereof, it will be understood that changes may be made in the valve arrangement as above set forth without departing from the spirit of the invention or exceeding the scope thereof as defined in the following claims:

I claim:

1. A flow control valve comprising a valve body having a regulating chamber formed within said valve body, said regulating chamber having an inlet for fluid entering said chamber and an outlet for fluid exiting said chamber and a through channel having a central axis connecting between said inlet and said outlet, said valve body further having a bore, said bore communicating with said through channel through an opening, a spherical elastomeric element having a centerpoint, said spherical elastomeric member contained at least partially within said through channel and partially within said bore, said elastomeric element having a predetermined known free state shape in its undeformed state and located within said through channel with its centerpoint displaced with respect to the central axis of said through channel toward said bore to allow flow of fluid through said channel along and around said elastomer element that is disposed within said through bore, and control means located within said bore and moveable within said bore to deform said elastomeric element to change the cross section of said through channel solely within said regulating chamber to thereby control the flow of fluid therethrough, said control means being moveable between a first position and intermediate positions where deformation beyond said regulating chamber and into said inlet and said outlet is prevented by means within said regulating chamber, while at the same time the centerpoint remains within said bore, thereby controlling the fluid passing through said channel and a second position where said control means distorts said elastomeric member to block the fluid from passing between said inlet and said outlet while retaining said centerpoint displaced substantially toward said bore and above to the centerline of said central axis of said through channel to prevent said elastomeric member from getting stuck within said regulating chamber.

2. A flow control valve as defined in claim 1 wherein said elastomeric member has an outer surface and said control means for deforming said elastomeric member comprises a member positioned within said bore that acts against the outer surface of said elastomeric member and is moveable toward said elastomeric member to close said bore and said inlet while remaining within said bore and away from said elastomeric member to allow flow past said elastomeric member during said intermediate positions.

3. A flow control valve as defined in claim 2 wherein said control means comprises a valve spindle threadedly engaged to said valve body and which is rotatable to deform said elastomeric member and said flow control valve further includes a stop means to prevent said valve spindle from entering said through channel.

4. A flow control control valve as defined in claim 1 wherein said inlet comprises a plurality of inlets.

5. A flow control valve as defined in claim 1 wherein said outlet comprises a plurality of outlets.

6. A flow control valve for controlling the flow of a fluid, said flow control valve comprising a valve body having a first inlet and an outlet and having a through channel having a central axis providing a path for fluid between said first inlet and said outlet, a regulating chamber formed within said channel intermediate said first inlet and said outlet, a second inlet in said valve body intersecting said channel at an intersecting point within said regulating chamber for flushing said regulating chamber, said valve body having a bore, said bore communication with said regulating chamber through an opening located generally at said intersecting point, an elastomeric element having a centerpoint, said elastomeric element contained at least partially within said chamber generally at said intersecting point, said elastomeric element having a known free state allowing the flow of fluid from said first and second inlets to said outlet and with said centerpoint remaining within said bore, and deforming means contained within said bore acting upon said elastomeric element to deform said elastomeric element, said deforming means moving between a first position and intermediate positions where deformation of said elastomeric element beyond said regulating chamber and into said inlets and said outlet is prevented by means within said regulating chamber, while at the same time the centerpoint remains within said bore so that fluid can flow from said first and second inlets to said outlet and a second position where said elastomeric element blocks flow from both said first inlet and said second inlet to said outlet and blocks said bore opening, and said intermediate positions having at least one position for deforming said elastomeric element to block flow from said second inlet to said outlet but allow flow from said first inlet to said outlet.

7. A flow control valve as defined in claim 6 wherein said deforming means comprises a spindle moveable within said valve body to deform said elastomeric element, said spindle moveable along an axis intersecting said intersecting point within said regulating chamber.

8. A flow control valve as defined in claim 7 wherein said spindle further deforms said elastomeric element in moving between said first and second positions to control the flow of fluid passing between said first inlet and said outlet.

9. A flow control valve as defined in claim 6 wherein said elastomeric element is spherical.

10. A flow control valve as defined in claim 6 wherein said elastomeric member is torroidal.

* * * * *